US012751797B2

(12) United States Patent
Narita

(10) Patent No.: US 12,751,797 B2
(45) Date of Patent: Oct. 6, 2026

(54) ORTHODONTIC BRACKET

(71) Applicant: Shinichi Narita, Tokyo (JP)

(72) Inventor: Shinichi Narita, Tokyo (JP)

(73) Assignee: Narita Shinichi, Tokyo (JP)

( * ) Notice: Subject to any disclaimer, the term of this patent is extended or adjusted under 35 U.S.C. 154(b) by 196 days.

(21) Appl. No.: 18/562,347

(22) PCT Filed: May 17, 2022

(86) PCT No.: PCT/JP2022/020524
§ 371 (c)(1),
(2) Date: Nov. 20, 2023

(87) PCT Pub. No.: WO2022/244771
PCT Pub. Date: Nov. 24, 2022

(65) Prior Publication Data

US 2024/0245493 A1 Jul. 25, 2024

(30) Foreign Application Priority Data

May 21, 2021 (JP) ................................ 2021-085946

(51) Int. Cl.
*A61C 7/14* (2006.01)

(52) U.S. Cl.
CPC ...................................... *A61C 7/14* (2013.01)

(58) Field of Classification Search
CPC ... A61C 7/12; A61C 7/14–18; A61C 7/22–36; A61C 7/143; A61C 7/148
See application file for complete search history.

(56) References Cited

U.S. PATENT DOCUMENTS 5,823,771 A * 10/1998 Nord ........................ A61C 7/16 433/14
5,993,207 A * 11/1999 Spencer ................. A61C 7/282 433/18

(Continued)

FOREIGN PATENT DOCUMENTS

JP 2010-274110 A 12/2010
JP 2013-502272 A 1/2013

(Continued)

OTHER PUBLICATIONS

International Search Report of International Patent Application No. PCT/JP2022/020524 completed on Jun. 14, 2022 and mailed Jun. 28, 2022 (4 pages).

(Continued)

*Primary Examiner* — Edelmira Bosques
*Assistant Examiner* — Matthew P Saunders
(74) *Attorney, Agent, or Firm* — Pyprus Pte Ltd; George Liu

(57) ABSTRACT

An orthodontic bracket that firmly fixes the auxiliary tool and facilitates its attachment and removal is provided. The orthodontic bracket 1 comprises a bracket body 3, slot portions 7 and 9 fixed to the bracket body 3 for passing a wire 5, and an auxiliary tool attachment portion 13 fixed to the bracket body 3 for attaching an auxiliary tool, wherein the auxiliary tool attachment portion 13 comprises a ring-shaped body portion 15 and an opening and closing portion 17 for opening and closing the body portion 15.

6 Claims, 2 Drawing Sheets

(56) References Cited

U.S. PATENT DOCUMENTS

| | | | | |
|---|---|---|---|---|
| 6,558,160 | B2 * | 5/2003 | Schnaitter | A61C 7/00 433/22 |
| 2009/0035715 | A1 * | 2/2009 | Cleary | A61C 7/36 433/17 |
| 2009/0120131 | A1 * | 5/2009 | Borowski | A44C 15/007 63/33 |
| 2012/0028207 | A1 * | 2/2012 | Cleary | A61C 7/00 433/10 |
| 2012/0028208 | A1 * | 2/2012 | Cleary | A61C 7/22 433/19 |
| 2014/0205963 | A1 * | 7/2014 | Cleary | A61C 7/282 433/17 |
| 2016/0220331 | A1 | 8/2016 | Johnston | |
| 2022/0163083 | A1 * | 5/2022 | Jolley | F16F 1/042 |

FOREIGN PATENT DOCUMENTS

| | | | | |
|---|---|---|---|---|
| JP | 2016-42979 | A | 4/2016 | |
| WO | WO-2010120580 | A1 * | 10/2010 | A61C 7/00 |

OTHER PUBLICATIONS

Written Opinion of International Patent Application No. PCT/JP2022/020524 completed on Jun. 14, 2022 and mailed Jun. 28, 2022 (4 pages).

* cited by examiner

ORTHODONTIC BRACKET

TECHNICAL FIELD

This invention relates to an orthodontic bracket.

BACKGROUND OF THE INVENTION

Dental brackets are described in Japanese Patent Publication No. 2010-274110.

Orthodontic methods using elasticity, such as wires, to fix orthodontic brackets or tubes to the teeth are known. Orthodontic brackets are used by being fastened to the patient's teeth in order to apply the load occurred by the bending or tension of the wire to the teeth to be corrected.

CITATION LIST

Patent Literature

Patent Literature 1: JP 2010-274110 A

SUMMARY OF THE INVENTION

Technical Problem

However, conventional dental brackets have adjustable hooks to which auxiliary tools are attached. In this case, there is a problem that the auxiliary tools were easily detached from the hook, and it is difficult to reattach them.

An object of a certain invention described in this specification is to provide an orthodontic bracket comprising an auxiliary tool attachment portion to firmly secure an auxiliary tool and to facilitate its attachment and removal by a ring-shaped body portion and an opening and closing portion, and a slot portion for passing a wire.

Solution to Problem

A certain invention described in this specification is based on the finding that an orthodontic bracket comprises a slot for a wire to pass through, and an auxiliary tool attachment portion for attaching an auxiliary tool, thereby the auxiliary tool can be secured firmly and the attachment of the auxiliary tool can be facilitated.

A certain invention described in this specification relates to an orthodontic bracket 1. This orthodontic bracket 1 comprises a bracket body 3, one or a plurality of slot portions 7 and 9 fixed to the bracket body 3 for passing a wire 5, and an auxiliary tool attachment portion 13 fixed to the bracket body 3 for attaching an auxiliary tool, wherein the auxiliary tool attachment portion 13 comprises a ring-shaped body portion 15 and an opening and closing portion 7 for opening and closing the body portion 15.

A preferred example of the above invention is the orthodontic bracket 1, wherein the auxiliary tool is a coil spring, an elastic or a power chain.

A preferred example of the above invention is the orthodontic bracket 1, wherein the auxiliary tool attachment portion 13 has a carabiner structure.

Advantageous Effect of Invention

A certain invention described in this specification is the orthodontic bracket with a ring-shaped body portion and an auxiliary tool attachment portion that makes the fixation of the auxiliary tool stronger and its attachment and removal easier by means of the opening and closing portion.

DETAILED DESCRIPTION OF EMBODIMENTS

The following is a description of the embodiment in which the present invention is to be implemented using the drawings. The present invention is not limited to the forms described below, but includes those that have been modified from the following forms as appropriate within the scope obvious to those skilled in the art.

Bracket 1 and Bracket Body 3

Figure 1:
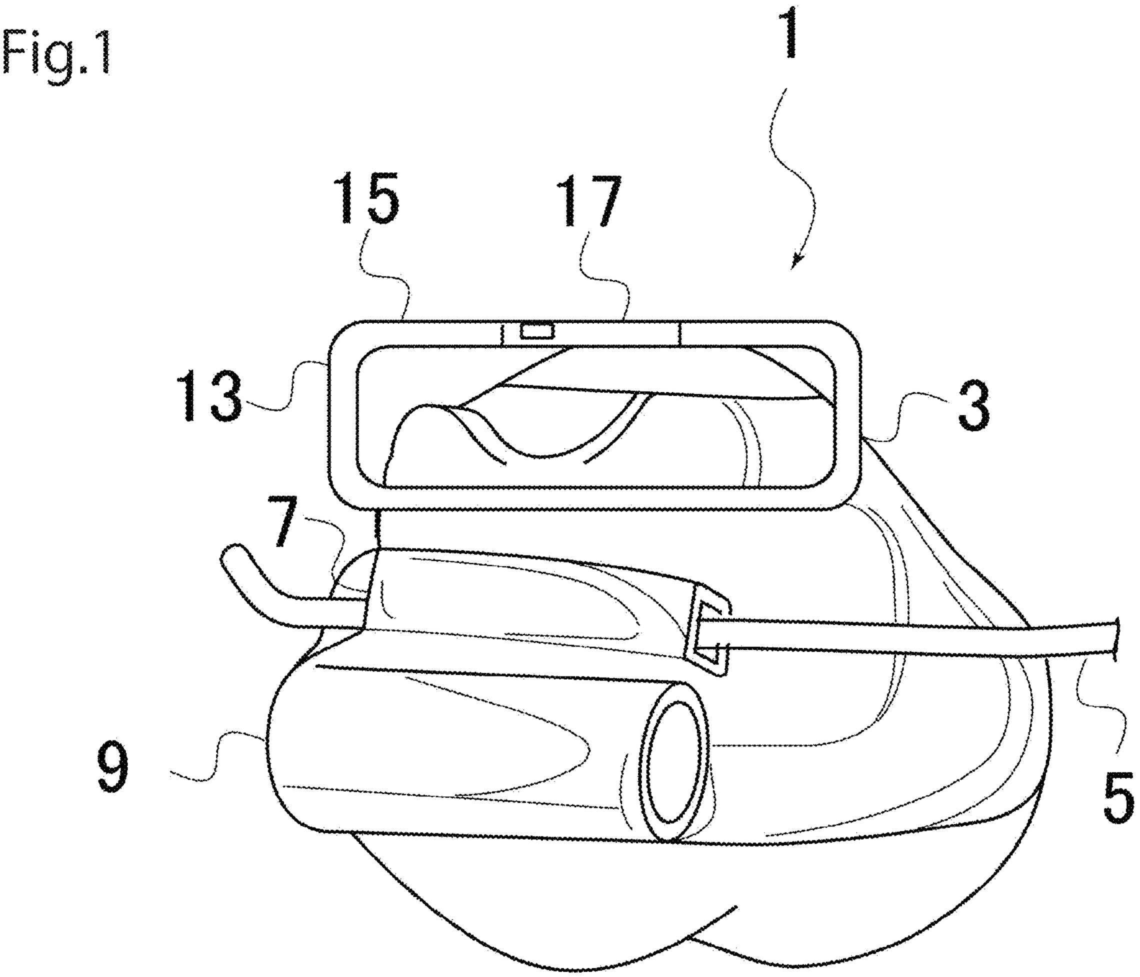
FIG. 1 is a schematic diagram illustrating a bracket of the present invention.

FIG. 1 is a schematic diagram illustrating a bracket 1 of the present invention. As shown in FIG. 1, the dental bracket 1 has a bracket body 3, a wire 5, a slot portion 7, a slot portion 9, an auxiliary tool attachment portion 13, a ring-shaped body 15 and an opening and closing portion 7. The bracket in this specification may be any known bracket used in dentistry.

The size of the bracket body 3 may, for example, be between 1 mm and 15 mm, or between 2 mm and 12 mm, in both vertical and horizontal in FIG. 1. Here, the horizontal dimension of the orthodontic bracket 1 is the size in the left-right direction on the paper surface of FIG. 1. In other words, it is the direction in which the holes of the slot portions 7 and 9 extend. The vertical dimension of the orthodontic bracket 1 is the size in the vertical direction on the surface of the paper in FIG. 1.

The bracket body 3 can be said to be the part that constitutes the base of the bracket 1. In the example shown in FIG. 1, a slot 7 and a slot 9 are attached to the surface of the bracket body 3. Here, the surface of the bracket body 3 is the surface of the bracket opposite to the surface to be attached to the teeth. The slot 7 and the slot 9 may be fixed so that the beginning and end of their holes are centered at the left and right ends of the bracket. The slot 7 and the slot 9 may also be fixed in such a way that the direction of extension of those holes is parallel to the plane of the bracket surface. In the example of FIG. 1, the auxiliary tool attachment portion 13 is attached to the surface of the bracket. The auxiliary tool attachment portion 13 may be attached to the top of the bracket body 3, in FIG. 1.

As the material of the bracket body 3, for example, ceramic (preferably containing zirconia particles), plastic resin (e.g., polycarbonate), stainless steel (e.g., SUS304L), sapphire, pure titanium (TP340), titanium alloy (6A1-4V) etc. are used. The orthodontic bracket 1 is attached to the tooth surfaces with an adhesive.

Wire 5

The wire 5 is an element that connects adjacent brackets 1 to each other and attaches the brackets 1 to the teeth with which they are in contact. The wire 5 connects the adjacent brackets 1 to each other by being passed through the holes in the slot 7 and the slot 9. The total length of the wire 5 may be between 20 mm and 250 mm, between 30 mm and 150 mm, or between 40 mm and 120 mm. The ends of the wire 5 may be curved so that the wire 5 is not displaced from the slot 7 and the slot 9. This may prevent the wire 5 from coming off from the slots 7 and 9 by the curved portion of the wire 5 being caught in the slot openings or the like, even if a shock is applied to the wire 5.

The material of the wire 5 is preferably ceramic (preferably containing zirconia particles), plastic resin (e.g., polycarbonate), stainless steel (e.g., SUS304L), sapphire, pure titanium (TP340), or titanium alloy (6A1-4V) etc., for example.

Slots 7 and 9

The slot 7 and the slot 9 are the sites for fixing the wire 5. As shown in FIG. 1, the slot 7 and the slot 9 are fixed to the surface of the bracket body 3. The slot 7 and the slot 9 may be square pole-shaped cylindrical objects that are hollow inside.

The above square pole-shaped cylinder may have a hole in two opposing faces (top and bottom) that are smaller than the other two opposing faces, and the two faces may be connected through the hole. The height of the slot 7 and the slot 9 may be between 0.4 mm to 1.5 mm, between 0.5 mm to 1.3 mm, or between 0.6 mm to mm 1.2 mm, with the above two faces as the top and bottom surfaces. The vertical length of the above square pole may be, with the above two faces of the slot 7 and the slot 9 as the top and bottom surfaces, between 0.4 mm and 1.0 mm, between 0.5 mm and 0.9 mm, or between 0.6 mm and 0.8 mm.

Similarly, the horizontal length of the above square pole may be between 0.4 mm and 1.0 mm, between 0.5 mm and 0.9 mm, or between 0.6 mm and 0.8 mm. The slot 7 and the slot 9 may be separated from each other, or they may be bonded or connected to each other via certain faces of the above square pole. The wire 5 may be passed through the holes in the slot 7 and the slot 9. This allows the adjacent brackets 1 to be connected to each other and the brackets 1 to be attached to the teeth.

As materials for the slots 7 and 9, for example, ceramic (preferably containing zirconia particles), plastic resin (e.g., polycarbonate), stainless steel (e.g., SUS304L), sapphire, pure titanium (TP340), titanium alloy (6A1-4V), etc. are used.

Auxiliary Tool Attachment Portion 13

The auxiliary tool attachment portion 13 is a portion for attaching an auxiliary tool. The auxiliary tool attachment portion 13 may comprise a ring-shaped body portion 15 and an opening and closing portion 17.

The auxiliary tool attachment portion 13 is fixed to the upper portion of the bracket body 3 in FIG. 1. The auxiliary tool attachment portion 13 may be mounted above and adjacent to the slot 7 and the slot 9, for example. The auxiliary tool attachment portion 13 may also have a carabiner structure. The vertical length of the auxiliary tool attachment portion 13 may be between 1 mm and 15 mm, or between 2 mm and 12 mm, in FIG. 1. The horizontal length of the auxiliary tool attachment portion 13 may be between 1 mm and 15 mm, or between 2 mm and 13 mm, in FIG. 1.

The material of the auxiliary tool attachment portion 13 is preferably ceramic (preferably containing zirconia particles), plastic resin (e.g., polycarbonate), stainless steel (e.g., SUS304L), sapphire, pure titanium (TP340), or titanium alloy (6A1-4V) etc., for example. In order to eliminate discomfort when the orthodontic bracket is attached, the auxiliary tool attachment portion 13 may be coated with trehalose to have a trehalose layer. In this way, a natural sweet taste can be perceived when the orthodontic bracket is attached in the oral cavity, and the metallic taste can be suppressed.

Ring-Shaped Body Portion 15

The ring-shaped body portion is one of the elements that make up the auxiliary tool attachment portion 13. The ring-shaped body portion 15 is a ring-shaped portion fixed to the upper portion of the bracket body 3, for example, in FIG. 1.

For example, the auxiliary tool attachment portion 13 with a ring-shaped body portion 15 may have a carabiner structure. As shown in FIG. 1, the auxiliary tool attachment portion 13 has an area surrounded by a ring of the ring-shaped body portion 15. The ring-shaped body portion 15 may be fixed to the bracket body 1 such that the orientation of the hole surrounded by the ring is perpendicular to the plane of the surface of the bracket body 1. As shown in FIG. 1, the ring-shaped body portion 15 may have a portion of the area surrounded by the ring facing the bracket body 3. That is, a portion of the surrounded area may deviate from the surface of the bracket body 1 and be fixed in a way that it protrudes. The area of the deviating area may occupy between 20% and 80%, between 30% and 70%, or between 40% and 60% of the total area surrounded by the ring. Thus, since a space is created in a portion of the area surrounded by the ring of the ring-shaped body portion 15, the auxiliary tool described below can be attached to that portion.

The carabiner structure may have a hole in its ring symmetrical in shape, either vertically or horizontally, or one area of its ring may be more bulging than the other said area. It may also be in the shape of the D of the alphabet, with a portion of the ring forming a straight line. The total length of the ring of the ring-shaped body portion 15 may be between 1 mm and 15 mm, between 2 mm and 13 mm, or between 3 mm and 12 mm.

As materials for the ring-shaped body portion 15, for example, ceramic (preferably containing zirconia particles), plastic resin (e.g., polycarbonate), stainless steel (e.g., SUS304L), sapphire, pure titanium (TP340), titanium alloy (6A1-4V), etc. are used.

Opening and Closing Portion 17

The opening and closing portion 17 is one of the elements that make up the auxiliary tool attachment portion 13. The opening and closing portion 17 is a portion for opening and closing the ring-shaped body portion 15. The opening and closing portion 17 is a part of the ring of the ring-shaped body portion 15. It is preferred that the opening and closing portion 17 is a portion of the ring of the ring-shaped body portion 15 that is not in contact with the surface of the bracket body 3. This allows the auxiliary tool described below can be attached to the auxiliary tool attachment portion 13 by opening the opening and closing portion 17, without being obstructed by the surface of the bracket body 3. This shape makes it possible to easily reattach the auxiliary tool to the auxiliary tool attachment portion 13, even if the auxiliary tool comes off from the auxiliary tool attachment portion 13 for some reason, for example.

One end of the opening and closing portion 17 may be secured to the ring-shaped body portion 15 via a fastening metal or the like. For example, the fastening metal or the like may connect and secure the end portion of the ring of the ring-shaped body portion 15 and the end portion of the opening and closing portion 17. On the other hand, it is preferable that the other end of the opening and closing portion 17 is not completely fixed to the auxiliary tool attachment portion 13 by the fastening metal or the like, and is able to open and close freely. The other end of the opening and closing portion 17 and the auxiliary tool attachment portion 13 may be connected by a screw type (screw lock type) or the like. The part also may be of the triactlock type, in which the other end of the opening and closing portion 17 can be shifted to the direction perpendicular to the orientation of the hole of the ring and can be rotated halfway around an axis with the end of the opening and closing portion 15 secured by the fastening metal or the like.

For the opening and closing portion 17, for example, ceramic (preferably containing zirconia particles), plastic resin (e.g., polycarbonate), stainless steel (e.g., SUS304L), sapphire, pure titanium (TP340), titanium alloy (6A1-4V), etc. are used.

Auxiliary Tool

An auxiliary tool is a tool that is attached to said auxiliary tool attachment portion 13. The auxiliary tool may be, for example, a coil spring, an elastic or a power chain.

An auxiliary tool is an element that assists in the connection of adjacent brackets 1 to each other.

For the auxiliary tool, for example, ceramic (preferably containing zirconia particles), plastic resin (e.g., polycarbonate), stainless steel (e.g., SUS304L), sapphire, pure titanium (TP340), titanium alloy (6A1-4V), etc. are used.

This invention relates to an orthodontic bracket. Methods of manufacturing and using orthodontic brackets are well known. Therefore, the orthodontic bracket regarding this invention can be manufactured based on the known methods and used in the same way as ordinary orthodontic brackets.

Figure 2:
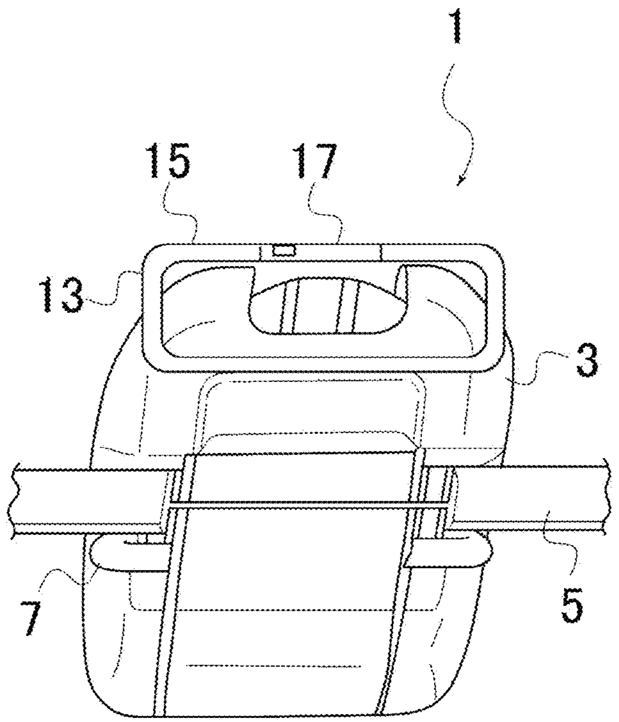
FIG. 2 is a schematic diagram of an orthodontic bracket different from one of FIG. 1.

FIG. 2 shows an orthodontic bracket different from one of FIG. 1. As shown above, the orthodontic brackets of this invention can adopt the configuration of known orthodontic brackets, except that they have a characteristic auxiliary tool attachment portion or a preferred form for it.

INDUSTRIAL APPLICABILITY

This invention may be used in the technical field related to orthodontic brackets that hold wires.

REFERENCE SIGNS LIST

1 . . . orthodontic bracket
3 . . . bracket body
5 . . . wires
7 . . . slot portion
9 . . . slot portion
13 . . . auxiliary tool attachment portion
15 . . . ring-shaped body portion
17 . . . opening and closing portion

What is claimed is:

1. An orthodontic bracket (1) comprises;
a bracket body (3),
one or a plurality of slot portions (7, 9) fixed to the bracket body (3) for passing a wire (5), and
an auxiliary tool attachment portion (13) fixed to the bracket body (3) for attaching an auxiliary tool, wherein the auxiliary tool is different from the wire,
wherein the auxiliary tool attachment portion (13) comprises;
a body portion (15), and
an opening and closing portion (17) for opening and closing the body portion (15), wherein the opening and closing portion (17) is a part of the body portion and the opening and closing portion are configured to be repeatedly opened and closed,
wherein, when the opening and closing portion is closed, the body portion forms a ring and the opening and closing portion is a part of the ring formed by the body portion, and the ring-shaped body portion has an area surrounded by a ring facing the bracket body (3) and the ring-shaped body portion defining a closed loop,
wherein at least a part of an area surrounded by the ring-shaped body portion is spaced from a surface of the bracket body (3) to define a space for receiving the auxiliary tool,
wherein the opening and closing portion (17) is located at a portion of the ring-shaped body portion that is not in contact with the bracket body (3),
wherein the auxiliary tool attachment portion (13) has a carabiner structure.

2. The orthodontic bracket (1) according to claim 1, wherein the auxiliary tool is a coil spring, an elastic or a power chain.

3. The orthodontic bracket (1) according to claim 1, wherein the auxiliary tool attachment portion (13) is configured so that the opening and closing portion can be opened and closed while maintaining the shape of the portion of the body portion other than the opening and closing portion.

4. The orthodontic bracket (1) according to claim 1, wherein the body portion (15) has an area deviating from the area of the ring facing the bracket body (3).

5. The orthodontic bracket (1) according to claim 4, wherein the deviating area occupies between 20% and 80% of the total area surrounded by the ring.

6. The orthodontic bracket (1) according to claim 1, wherein the auxiliary tool attachment portion (13) has a trehalose layer which contains trehalose.

* * * * *